US008024323B1

(12) United States Patent  
Nayfeh (10) Patent No.: US 8,024,323 B1  
(45) Date of Patent: Sep. 20, 2011

(54) NATURAL LANGUAGE SEARCH FOR AUDIENCE

(75) Inventor: Basem Nayfeh, Mercer Island, WA (US)

(73) Assignee: AudienceScience Inc., Bellevue, WA (US)

( * ) Notice: Subject to any disclaimer, the term of this patent is extended or adjusted under 35 U.S.C. 154(b) by 693 days.

(21) Appl. No.: 11/972,591

(22) Filed: Jan. 10, 2008

Related U.S. Application Data

(63) Continuation of application No. 11/051,294, filed on Feb. 3, 2005, now abandoned, which is a continuation of application No. 10/968,863, filed on Oct. 18, 2004, now abandoned, which is a continuation of application No. 10/733,815, filed on Dec. 10, 2003, now abandoned.

(60) Provisional application No. 60/520,141, filed on Nov. 13, 2003.

(51) Int. Cl.  
G06F 7/00 (2006.01)  
G06F 17/30 (2006.01)

(52) U.S. Cl. ................. 707/715; 707/805; 705/14.49

(58) Field of Classification Search ............ 707/715, 707/805, 999.003; 705/14.49  
See application file for complete search history.

(56) References Cited

U.S. PATENT DOCUMENTS

| | | |
|---|---|---|
| 5,414,838 A | 5/1995 | Kolton et al. |
| 5,740,425 A | 4/1998 | Povilus |
| 5,873,056 A | 2/1999 | Liddy et al. |
| 5,918,014 A | 6/1999 | Robinson |
| 5,974,398 A | 10/1999 | Hanson et al. |
| 5,974,413 A | 10/1999 | Beauregard et al. |
| 5,974,451 A | 10/1999 | Simmons |
| 6,029,165 A | 2/2000 | Gable |
| 6,029,195 A | 2/2000 | Herz |
| 6,070,160 A | 5/2000 | Geary |
| 6,078,866 A | 6/2000 | Buck et al. |
| 6,085,229 A | 7/2000 | Newman et al. |
| 6,247,021 B1 | 6/2001 | Himmel et al. |
| 6,266,649 B1 | 7/2001 | Linden et al. |
| 6,285,987 B1 | 9/2001 | Roth et al. |
| 6,292,796 B1 | 9/2001 | Drucker et al. |
| 6,317,761 B1 | 11/2001 | Landsman et al. |
| 6,324,519 B1 | 11/2001 | Eldering |

(Continued)

FOREIGN PATENT DOCUMENTS

EP 1026610 A2 8/2000

(Continued)

OTHER PUBLICATIONS

U.S. Appl. No. 09/613,403.

(Continued)

*Primary Examiner* — Phong Nguyen  
(74) *Attorney, Agent, or Firm* — Perkins Coie LLP (57) ABSTRACT

A facility for defining a group of people is described. The facility provides a visual user interface containing a control for receiving a query string. The facility receives a query string via the control, and uses an index on a body of documents to identify documents of the body that satisfy the received query string. The facility accesses a record indicating which documents of the body were accessed by each of a population of people during a foregoing time period to identify people among the population that accessed at least a threshold number of the identified documents during the foregoing time period. The facility displays within the visual user interface, in conjunction with the control, information characterizing the people identified.

8 Claims, 7 Drawing Sheets

U.S. PATENT DOCUMENTS

| | | | |
|---|---|---|---|
| 6,356,879 | B2 | 3/2002 | Aggarwal et al. |
| 6,487,538 | B1 | 11/2002 | Gupta et al. |
| 6,692,796 | B2 | 2/2004 | Ichinose et al. |
| 6,732,150 | B1 | 5/2004 | Thrane |
| 6,804,659 | B1 | 10/2004 | Graham et al. |
| 6,829,780 | B2 | 12/2004 | Kraft et al. |
| 6,832,207 | B1 | 12/2004 | Shkedi |
| 6,834,252 | B2 * | 12/2004 | Yokota .................... 702/150 |
| 6,937,996 | B1 | 8/2005 | Forsythe et al. |
| 6,978,263 | B2 | 12/2005 | Soulanille |
| 6,981,040 | B1 * | 12/2005 | Konig et al. ................ 709/224 |
| 6,983,272 | B2 | 1/2006 | Davis et al. |
| 7,299,195 | B1 | 11/2007 | Tawakol et al. |
| 7,503,057 | B2 | 3/2009 | Rosin et al. |
| 7,555,485 | B2 * | 6/2009 | Soulanille ................ 707/999.1 |
| 7,747,465 | B2 * | 6/2010 | Srinivasan et al. ........... 705/14.4 |
| 2001/0014876 | A1 | 8/2001 | Miyashita |
| 2001/0041566 | A1 | 11/2001 | Xanthos et al. |
| 2001/0047354 | A1 * | 11/2001 | Davis et al. ................... 707/3 |
| 2001/0049674 | A1 | 12/2001 | Talib et al. |
| 2002/0007308 | A1 | 1/2002 | Anderson et al. |
| 2002/0013729 | A1 * | 1/2002 | Kida .............................. 705/14 |
| 2002/0046104 | A1 | 4/2002 | Kaddeche et al. |
| 2002/0077900 | A1 * | 6/2002 | Thompson et al. ............ 705/14 |
| 2002/0120564 | A1 * | 8/2002 | Strietzel ......................... 705/40 |
| 2002/0124098 | A1 | 9/2002 | Shaw |
| 2002/0133490 | A1 * | 9/2002 | Conkwright et al. ............. 707/9 |
| 2003/0014213 | A1 * | 1/2003 | Yokota ........................ 702/150 |
| 2003/0028451 | A1 | 2/2003 | Ananian |
| 2003/0055729 | A1 | 3/2003 | Bezos et al. |
| 2003/0088465 | A1 | 5/2003 | Monteverde |
| 2003/0110080 | A1 | 6/2003 | Tsutani et al. |
| 2003/0110497 | A1 | 6/2003 | Yassin et al. |
| 2003/0135460 | A1 | 7/2003 | Talegon |
| 2003/0191753 | A1 | 10/2003 | Hoch |
| 2003/0200168 | A1 | 10/2003 | Cullen et al. |
| 2004/0015397 | A1 | 1/2004 | Barry et al. |
| 2004/0036622 | A1 | 2/2004 | Dukach et al. |
| 2004/0059708 | A1 | 3/2004 | Dean et al. |
| 2004/0267611 | A1 * | 12/2004 | Hoerenz ......................... 705/14 |
| 2005/0033771 | A1 | 2/2005 | Schmitter et al. |
| 2005/0071325 | A1 * | 3/2005 | Bem ................................ 707/3 |
| 2005/0080772 | A1 * | 4/2005 | Bem ................................ 707/3 |
| 2005/0091109 | A1 | 4/2005 | Howard et al. |
| 2005/0097088 | A1 | 5/2005 | Bennett et al. |
| 2005/0123006 | A1 * | 6/2005 | Tanaka et al. ................ 370/901 |
| 2005/0144067 | A1 * | 6/2005 | Farahat et al. ................ 705/14 |
| 2006/0253434 | A1 * | 11/2006 | Beriker et al. .................... 707/3 |

FOREIGN PATENT DOCUMENTS

| | | | |
|---|---|---|---|
| JP | 2000228704 | | 8/2000 |
| WO | WO 97/21183 | A1 | 6/1997 |
| WO | WO 98/34189 | A1 | 8/1998 |
| WO | WO 99/60504 | A1 | 11/1999 |
| WO | WO 00/08802 | A2 | 2/2000 |
| WO | WO 01/07985 | A2 | 2/2001 |
| WO | WO 02/21292 | * | 3/2002 |

OTHER PUBLICATIONS

U.S. Appl. No. 12/714,352.
U.S. Appl. No. 60/479,353.
U.S. Appl. No. 10/653,703, Nayfeh et al.
U.S. Appl. No. 10/733,815, Nayfeh.
U.S. Appl. No. 10/830,874, Tawakol et al.
U.S. Appl. No. 10/968,863, Nayfeh.
U.S. Appl. No. 11/048,973, Tawakol et al.
U.S. Appl. No. 11/049,411, Tawakol et al.
U.S. Appl. No. 11/049,491, Tawakol et al.
U.S. Appl. No. 11/051,294, Nayfeh.
U.S. Appl. No. 12/407,740, Tawakol et al.
U.S. Appl. No. 12/410,418, Nayfeh.
U.S. Appl. No. 12/485,005, Tawakol et al.
"All You Wanted to Know About Online Advertising," http://www.cs.northwestern.edu/~paritosh/links/online.html, 12 pages, Feb. 18, 2000.
B2B Business.net, "Advertising & Media Links.," 4 pages, Apr. 7, 2002.
Flynn, Laurie J., "Let's Make a Deal," Context, 6 pages, Fall 1998.
Flynn, Laurie J., "With Goto.com's Search Engine, The Highest Bidder Shall Be Ranked First," The New York Times Company, 3 pages, Mar. 16, 1998.
Garofalakis, John et al., "Web Site Optimization Using Page Popularity," IEEE Internet Computing, pp. 22-29, Jul.-Aug. 1999.
Global Information Network, LLC, "The Online Ad Network For Global Business and E-Commerce," 6 pages, 2000.
Hansell, Saul, "Big Web Sites to Track Steps of Their Users," The New York Times Company, 6 pages, Aug. 16, 1998.
Morgan, Cynthia, "Porn Paves the Way for Web Site Profits," Computerworld, 2 pages, Aug. 30, 1999.
Naor, Moni et al., "Secure Accounting and Auditing on the Web," Computer Networks and ISDN Systems, vol. 30, Issue 1-7, 16 pages, Apr. 1998.
NetPlus Marketing, Inc., "NetPlus Marketing Monthly Jul. 1999," 3 pages, Jul. 1999.
Newpoff, Laura, "AdOutlet.com Sees Market in Empty Advertising Space," Business First of Columbus, 2 pages, Jun. 11, 1999.
Novak, Thomas P. et al., "New Metrics for New Media: Toward the Development of Web Measurement Standards," W3C Journal, 42 pages, 1997.
OneMediaPlace, http://web.archive.org/web/20001109161600/ http://www.onemediaplace.com, 7 pages, downloaded Jul. 26, 2005.
Parker, Pamela, "Online Ad Industry Exchange Activity Heats Up," InternetNews, 3 pages, Mar. 31, 2000.
Perdue, Lewis, "Adauction Targets Unsold Banner Space." InternetNews, 3 pages, Sep. 1, 1999.
Riabov, Anton et al., "Clustering Algorithms for Content Based Publication-Subscription Systems," Proceedings of the 22nd International Conference on Distributed Computing Systems, IEEE; 10 pages, 2002.
U.S. Appl. No. 11/048,973, Final Office Action, 15 pages, Apr. 8, 2008.
U.S. Appl. No. 11/049,228, Notice of Allowance and Fee(s) Due, 24 pages, Oct. 1, 2007.
U.S. Appl. No. 11/049,411, Final Office Action, 25 pages, Mar. 13, 2009.
U.S. Appl. No. 11/049,491, Final Office Action, 17 pages, Feb. 23, 2009.
Velasquez, Juan et al., "Combining The Web Content and Usage Mining To Understand The Visitor Behavior In a Web Site," Proceedings of the Third IEEE International Conference on Data Mining, IEEE, 4 pages, 2003.
Gupta, Amit et al., "Ad Insertion At Proxies To Improve Cache Hit Rates." Sun Microsystems Laboratories, 7 pages, 1999.

* cited by examiner

| | | | | | | | |
|---|---|---|---|---|---|---|---|
| 42 | Group 42 | 23.3 | 8 | 0.0 | 198 | 0.1% | $0.00 |
| 43 | Group 43 | 23.0 | 7 | 0.0 | 324 | 0.1% | $0.00 |
| 44 | Group 44 | 22.9 | 6 | 0.0 | 480 | 0.2% | $0.00 |
| 45 | Group 45 | 22.6 | 5 | 0.0 | 858 | 0.3% | $0.00 |
| 46 | Group 46 | 22.1 | 4 | 0.0 | 1586 | 0.5% | $0.00 |
| 47 | Group 47 | 21.2 | 3 | 0.0 | 3296 | 1.1% | $0.00 |
| 48 | Group 48 | 15.7 | 2 | 0.0 | 8354 | 2.8% | $0.00 |
| 49 | Group 49 | 11.2 | 1 | 0.0 | 27810 | 9.3% | $0.00 |

Save segment definition

Export list of selected users

Search Results

| Rank | Score | Page |
|---|---|---|
| 1 | 0.3934689 | WSJ.com – Cingular Wireless, SBC Communications, and BellSouth Introduce Unique Device for Routing Incoming Wireless Calls to Wireline Numbers |
| 2 | 0.37329596 | WSJ.com – Sierra Wireless Launches the MP 555 GPS Rugged Wireless Modem and Signs on First North American Customer |
| 3 | 0.3533455 | WSJ.com – Foundry Networks Offers Seamlessly Integrated Wireless and Wired Infrastructure Products to Deliver Secure, Reliable, Manageable And Scalable Total Solutions to the Enterprise |
| 4 | 0.3533455 | WSJ.com – Centennial Communications Corp. Announces First Quarter Results |
| 5 | 0.34979418 | WSJ.com – Verizon and Verizon Wireless Reach Barrier-free Porting Agreement in Advance of November 24 Deadline |
| 6 | 0.34490174 | WSJ.com – Verizon Wireless Challenges Competitors: Will You Be Ready for Local Number Portability on November 24th? |
| 7 | 0.34490174 | WSJ.com – Verizon Wireless Selects Nortel Networks for US$1 Billion Network Expansion |
| 8 | 0.34490174 | WSJ.com – CompassCom and Sierra Wireless Help Aurora (Colo.) Public Works Migrate to Next Generation Technology |
| 9 | 0.33993882 | WSJ.com – McLeodUSA to Provide Wireless Voice Services through Agreement with AT&T Wireless Services |
| 10 | 0.32459527 | WSJ.com – NETGEAR Launches 108 Mbps Wireless Speeds for Business in Its 802.11a/b/g Dual-Band Wireless Networking Solution |
| 11 | 0.31931695 | WSJ.com – China Mobile Offers Novatel Wireless Tri-Band GSM/GPRS PC Card Model; Merlin G301 Commercially Available Through Beijing MCC |
| 12 | 0.31394988 | WSJ.com – Motorola Broadband Products at CEDIA EXPO 2003 Enable Dealers and Integrators to Build a 'Connected Home' |
| 13 | 0.30848947 | WSJ.com – SpectraLink and Expanets Join Forces to Bring Wireless Telephones to Mid-Sized Businesses Requiring Immediate Access to Information; Agreement Provides Expanets Customers with Fully Interoperable Wireless VoIP Telephones |
| 14 | 0.30803946 | WSJ.com – Microsoft Unleashes New Fast and Easy-to-Use Home Networking Products With Automatic Security |
| 15 | 0.3039593 | WSJ.com – ABB's Wireless Technology Goes Beyond Mobile Phones |
| 16 | 0.3039593 | WSJ.com – U.S. Wireless Sector May Draw New Crowd of Outside Players |
| 17 | 0.3039593 | WSJ.com – U.S. Wireless Sector May Draw New Crowd of Outside Players |
| 18 | 0.3039593 | WSJ.com – U.S. Wireless Sector May Draw New Crowd of Outside Players |
| 19 | 0.30293065 | WSJ.com – Cable & Wireless U.S. Launches Business Ready Hosting |
| 20 | 0.30293065 | WSJ.com – America Online and Cingular Wireless Announce Launch of Text-Based Instant Messaging Service |
| 21 | 0.29563007 | WSJ.com – Microsoft Hardware Puts New Spin on Innovation |
| 22 | 0.29563007 | WSJ.com – Growing Disconnect |
| 23 | 0.29563007 | WSJ.com – NETGEAR Breaks the Speed Barrier with Industry First 108 Mbps 802.11b/g Wireless Networking Solution |
| 24 | 0.29149517 | WSJ.com – Western Wireless Files Amended Quarterly Reports for the First and Second Quarters of 2003 |
| 25 | 0.29149517 | WSJ.com – Western Wireless to Acquire Minnesota Wireless Properties |
| 26 | 0.29149517 | WSJ.com – Yankee Group Report Reveals Remedy for Global Wireless Churn |
| 27 | 0.29149517 | WSJ.com – RAINS and PBA Bring Together Today's Hottest Topics in October 2nd Wireless Conference & Homeland Security Summit |

*FIG. 2B*

Audience Search

Visitor Interests: wireless cellphone handheld wi-fi Nokia — 251

[ Search ] — 252
[ Save Search... ] — 253

Suggested Interests: mobile camera phone — 254

Search Results for Dow Jones (10/9/2003 – 10/25/2003): — 255

| Include | Rank | Category | Relevance Score | Reach | Total Page Views | Frequency |
|---|---|---|---|---|---|---|
| ☑ | | (users directly satisfying query) | 98.1 | 230 | | |
| ☑ | 1 | WSJOnline -> Technology -> Gadgets | 73.5 | 18,148 | 607,123 | 33.5 |
| ☑ | 2 | Virtual Category (wireless cellphone handheld wi-fi Nokia) | 77.3 | 17,683 | 586,459 | 33.2 |
| ☑ | 3 | WSJOnline -> Technology -> Telecommunications | 46.8 | 10,112 | 312,456 | 30.9 |
| ☑ | 4 | WSJOnline -> ARTICLES CATEGORY -> Articles & Columns -> Personal Technology | 55.4 | 14,134 | 423,859 | 30.0 |
| ☑ | 5 | WSJOnline -> Technology -> E-Commerce | 38.9 | 7,951 | 481,876 | 60.6 |
| ☑ | 6 | WSJOnline -> ARTICLES CATEGORY -> Articles & Columns -> The Mossberg Solution | 58.3 | 3,272 | 157,251 | 48.1 |
| | | Segment: | 72.4 | 50,320 | 2,583,758 | 51.3 |

256 — Include
257 — Rank
258 — Category
259 — Relevance Score
260 — Reach
261 — Total Page Views
262 — Frequency
263–270 — row indicators
280 — window

[ Export Users ] — 272
[ Create Segment ] — 271

| keyword ⟵ 401 | web page ⟵ 402 | index ⟵ 400 |
|---|---|---|
| | | |
| wired | http://www.wsj.com/ar02345.asp | ⟵ 411 |
| wired | http://www.wsj.com/ar13252.asp | ⟵ 412 |
| wireless | http://www.wsj.com/ar02215.asp | ⟵ 413 |
| wireless | http://www.wsj.com/ar02345.asp | ⟵ 414 |
| wireless | http://www.wsj.com/ar02345.asp | ⟵ 415 |
| wireless | http://www.wsj.com/ar02345.asp | ⟵ 416 |
| wireless | http://www.wsj.com/ar02345.asp | ⟵ 417 |
| | | |

*FIG. 4A*

| web page | user | user browsing history ⟵ 450 |
|---|---|---|
| | | |
| http://www.wsj.com/ar02344.asp | 313405303 | ⟵ 461 |
| http://www.wsj.com/ar02345.asp | 159654478 | ⟵ 462 |
| http://www.wsj.com/ar02345.asp | 313405303 | ⟵ 463 |
| http://www.wsj.com/ar02345.asp | 364561654 | ⟵ 464 |
| http://www.wsj.com/ar02345.asp | 415954981 | ⟵ 465 |
| http://www.wsj.com/ar02345.asp | 417646666 | ⟵ 466 |
| http://www.wsj.com/ar02345.asp | 446546566 | ⟵ 467 |
| http://www.wsj.com/ar02345.asp | 495456466 | ⟵ 468 |
| http://www.wsj.com/ar02345.asp | 873251321 | ⟵ 469 |
| http://www.wsj.com/ar02348.asp | 839879863 | ⟵ 470 |
| | | |

# NATURAL LANGUAGE SEARCH FOR AUDIENCE

CROSS-REFERENCE TO RELATED APPLICATION(S)

This application is a continuation of U.S. application Ser. No. 11/051,294, filed on Feb. 3, 2005 now abandoned, which is a continuation of U.S. application Ser. No. 10/968,643863, filed on Oct. 18, 2004 now abandoned, which is a continuation of U.S. application Ser. No. 10/733,815, filed on Dec. 10, 2003 now abandoned, each of which are hereby incorporated by reference in its entirety. This application is related to U.S. application Ser. No. 10/653,703, filed on Sep. 2, 2003, which is hereby incorporated by reference in its entirety. This application claims the benefit of provisional U.S. Patent Application No. 60/520,141, filed on Nov. 13, 2003, which is hereby incorporated by reference in its entirety.

TECHNICAL FIELD

The present invention is directed to providing technological support for advertising strategizing.

BACKGROUND

The process of advertising involves presenting advertising messages for a cause, such as the purchase of a product or service, to people. Advertising messages can be presented via a variety of channels, including television, print periodicals, postal mail, billboards, web pages, and electronic mail.

Depending upon the type of channel used for particular advertising and the specific technology that supports that channel, advertising may be targeted at different levels to specific people or groups of people. For example, in some cases, advertising presented on web pages can be targeted to specific people or groups of people.

Targeting advertising to particular people can provide advantages, including (1) increasing the average level of relevancy of an advertising message to the people that receive it, (2) ensuring that the advertising message is seen by the people most likely to be receptive to it, and (3) reducing the total cost of advertising by reducing the number of people to whom the message is presented. One approach to targeting advertising is population segmentation, in which groups of people are created that have common characteristics, and that are likely to be receptive to particular types of advertising messages.

Conventional approaches to defining segments within a population of people begin by collecting a body of profile information about each person in the population, such as information characterizing the person's web browsing activity, as well as other demographic or biographical information for the person. A user builds a query against this profile information, which is executed to identify the people in the segment, referred to as "populating" the segment.

While such conventional approaches to defining segments can often be completely effective at selecting the people intended by the user defining the segment, they are often difficult to use. Such a user must understand all of the information available in the profiles, understand the set of tests available in the query engine, and understand how to assemble these into a query. This process often requires the use of a fairly involved user interface. As a result, such conventional approaches are typically used only by a small number of very sophisticated users, and are very seldom used by users—such as front-line marketing and advertising personnel—who have the greatest capacity to identify and refine characteristics likely to make a person receptive to a particular cause or advertising message.

Further, the results of defining a segment are often not immediately available, and are often not meaningful or comprehensible to the user defining the segment, making it difficult for the user defining the query to reiteratively refine the segment definition to achieve the desired result.

In view of the shortcomings of conventional segment definition techniques, a new approach to segment definitions that enabled a larger group of users to more easily define segments, understand the result of a particular segment definitions, and to reiteratively refine the segment definition to achieve the desired result would have significant utility.

BRIEF DESCRIPTION OF THE DRAWINGS

FIGS. 2A-2C are display diagrams showing typical user interfaces presented by the facility.

DETAILED DESCRIPTION

A software facility for defining a segment or audience of advertising prospects or other people based upon a natural-language query ("the facility") is described. The facility operates with respect to a body of documents, such as web pages ("pages") making up a web site called the "subject web site," whose access by individual users can be tracked. The facility may also operate with respect to other groups of web pages, such as web pages making up web sites among a group of web sites; a body of documents of another type; or a group of objects other than documents each having text associated with them with which people may interact.

In some embodiments, the facility provides a user interface for receiving a natural-language query from a user, such as a group of keywords relating to the segment that the user wishes to create. As one example, for a segment intended to contain people interested in the field of wireless communication, the user might input the query "wireless." In some embodiments, queries can include such other elements as phrase grouping symbols, logical operators, logical grouping symbols, and/or property/value specifications. The facility identifies documents of the body that satisfy the query. For example, where the body of documents corresponds to the pages of a subject web site, some embodiments of the facility determine which pages satisfy the query by accessing a search index compiled on the pages of the web site.

The facility then selects people, who have accessed at least a minimum number of the identified documents. For example, where the body of documents corresponds to the pages of a subject web site, some embodiments of the facility access a user web browsing history derived from a web log generated by the web server serving the subject web site to select these users. The facility then displays information characterizing the users that are included in the defined segment is displayed, such as statistical overview information, details of representative selected users, aspects that tend to distinguish selected users from users not selected, etc. This characterizing information enables the user to assess the extent to which the defined segment resembles the intended segment.

After reviewing the characterizing information, the user may input a new query to refine the membership of the segment, or may use the last query to create a new segment definition based upon the query. The segment defined in the created segment definition may be used to sell and serve advertising directed to the people who are members of the segment. In some embodiments, a group of people satisfying the query may be immediately exported in order to perform an advertising campaign with respect to that group of people, or take other action with respect to that group of people. In some embodiments, the facility enables the user to augment the group of users satisfying a query with all of the users who accessed one or more documents among a group of documents that contains the higher number of documents satisfying the query. In some embodiments, the facility enables the user to select various subgroups of people from those identified by the facility for inclusion in the segment.

By enabling users to define segments in some or all of the manners discussed above, the facility reduces the levels of effort and instruction required to perform segment definition, and accordingly significantly expands the set of people able to do so. The facility also provides prompt feedback that makes it easy for the user to quickly judge the success of his or her efforts, and successfully define the intended segment through a process of incremental improvement. The facility's prompt feedback also makes the facility a useful tool for exploring a group of advertising prospects or other people, such as people browsing a subject web site.

Figure 1:
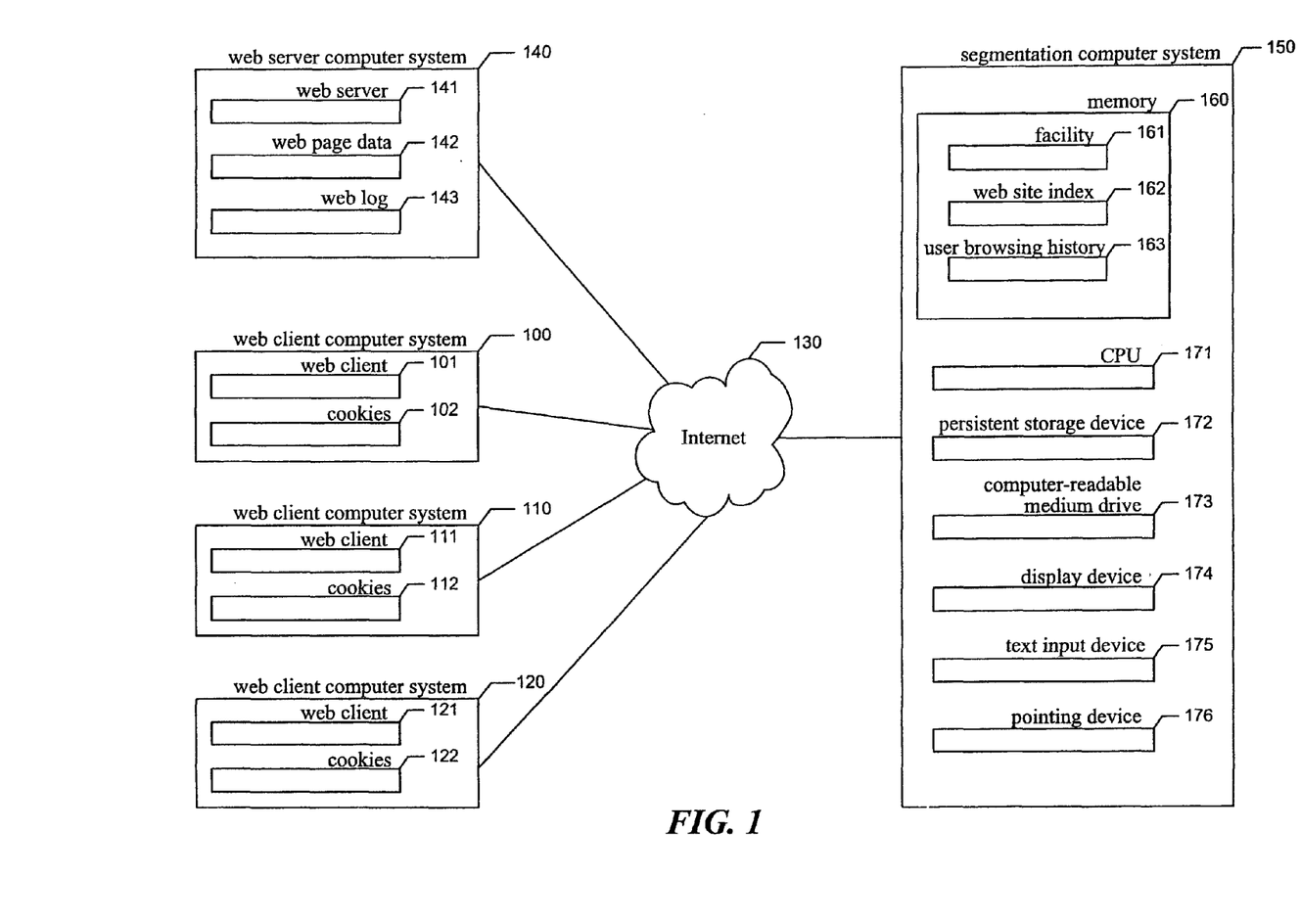
FIG. 1 is a high-level block diagram showing a typical environment in which the facility operates.

FIG. 1 is a high-level block diagram showing a typical environment in which the facility operates. The block diagram shows several client computer systems, such as client computer systems 100, 110, and 120. Each of the client computer systems has a web client computer program that a user of the client computer system can use to browse the World Wide Web, such as web clients 111, 121, and 131. Such web clients typically allow web servers within particular domains to store data in a form called a cookie on a client computer system as part of the process of responding to a request from the web client on that client computer system, such as cookies 102, 112, and 113. Such cookies may be used to store information uniquely identifying the client computer system and/ or its user, among other information. The web client forwards the information stored in a cookie with each future request it makes to the domain that created the cookie. The client computer systems are connected via the Internet 130 to a web server computer system 140. Those skilled in the art will recognize that these computer systems could be connected by networks other than the Internet, however.

The web server computer system 140 contains a web server computer program 141 for delivering web pages in response to requests from web clients; web page data 142 either containing the web pages served by the web server themselves, or data used by the web server to construct the web pages, such as instructions for constructing the web pages; and one or more logs 143 containing information about requests received and serviced by the web server, which includes the identity of the web page requested and the user submitting the request, as indicated by the cookie value enclosed with the request.

The sequentation computer system 150 contains a memory 160. The memory 160 preferably contains the facility 161; a web site index 162 indicating, for the subject web site, which web pages contain which words, typically compiled by sending a series of requests to the web server in order to "crawl"

the subject web site; and a user browsing history 163 that indicates which web pages of the subject web site have recently been visited by which users, typically constructed by retrieving and analyzing the contents of the web log. While items 161-163 are preferably stored in memory while being used, those skilled in the art will appreciate that these items, or portions of them, maybe be transferred between memory and a persistent storage device 172 for purposes of memory management and maintaining data integrity. The sequentation computer system further contains one or more central processing units (CPU) 171 for executing programs, such as the facility 161; a computer-readable medium drive 173 for reading information or installing programs such as the facility from computer-readable media, such as a floppy disk, a CD-ROM, or a DVD; a display device 174 for displaying visual information, such as a CRT or LCD monitor; a text input device 175, such as a keyboard or voice recognition system; and a pointing device 176, such as a mouse or touch pad.

While various embodiments of the facility are described in terms in the environment described above, those skilled in the art will appreciate that the facility may be implemented in a variety of other environments including a single, monolithic computer system, as well as various other combinations of computer systems or similar devices connected in various ways. In particular, the facility may interact with users via a wide range of portable and/or wireless user interface devices, such as cellular telephones, pagers, personal digital assistants, etc.

Figure 2A:
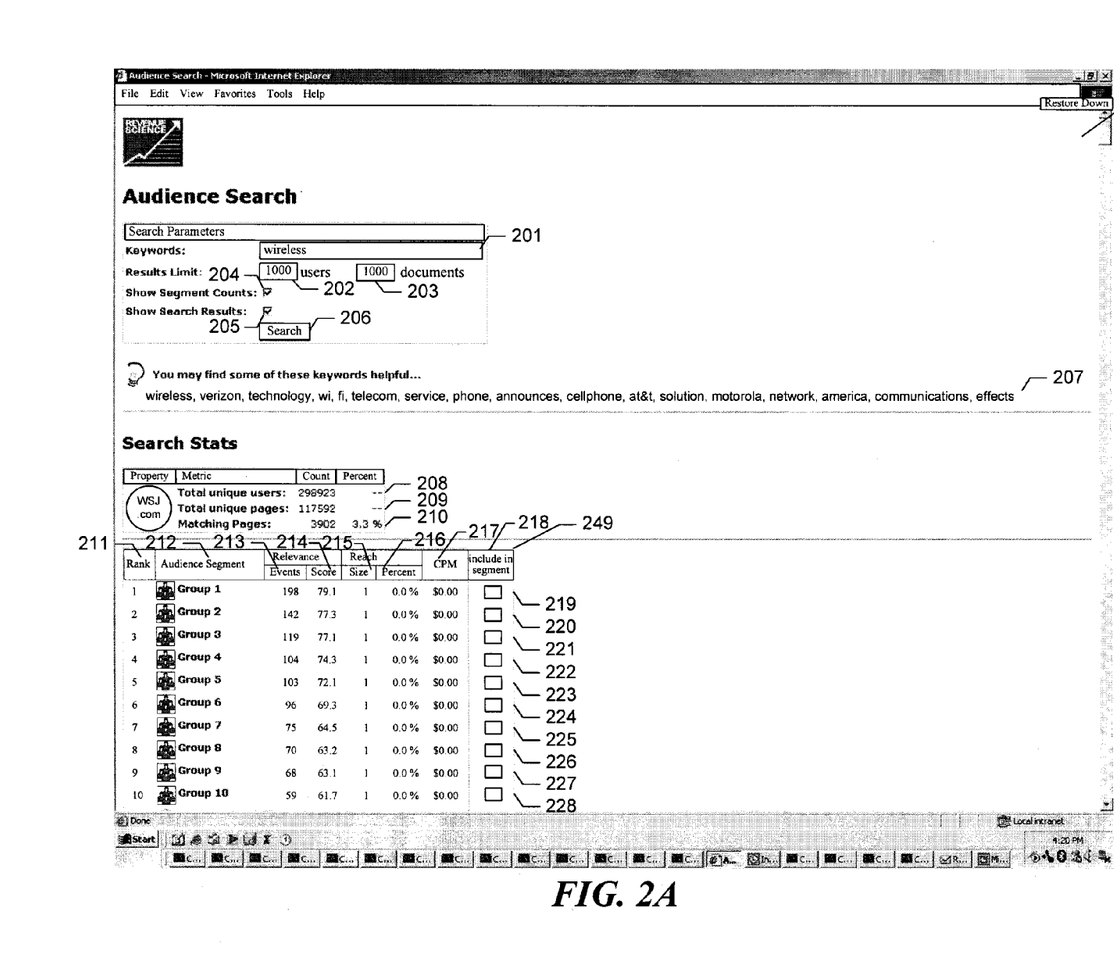

FIGS. 2A-2C are display diagrams showing typical user interfaces presented by the facility. FIGS. 2A-2B are display diagrams showing views of a first typical user interface presented by the facility. FIG. 2A shows a first view 200. The first view includes a keywords query field 201 into which the user may type a query containing keywords and other permissible query elements. In this case, the user has typed the query "wireless." The first view also includes a results limit field 202, into which the user can enter a maximum number of users to be included in the segment, and a results limit field 203, into which the user can enter a maximum number of documents to be considered in identifying users for the segment. The first view further contains checkboxes 204 and 205 that the user may check to respectively show information characterizing different groups of users and show the documents matching the query. The first view also includes a search button 206 that the user may select in order to execute this query.

After the user selects the search button 206, the facility displays the contents of the first view that are below the search button 206. These include a list 207 of additional keywords that are related to the keywords in the query. In some embodiments, this list is generated by identifying words that frequently occur in the titles, contents, or metadata of web pages matching the query. In other embodiments, the facility generates the list 207 of additional keywords that are associated or correlated with the user-specified keywords in a variety of other ways, such as by selecting keywords that appear together in a thesaurus, commonly appear together in queries, or occur together in other contexts.

The first view further contains statistics about the subject web site, including an indication 208 of the total number of unique users that visited the subject web site during the period in question, an indication 209 of the total number of unique pages in the subject web site during the period in question, and indications 210 of the number of those pages of the subject web site that matched the query.

The first view further contains information 249 characterizing the users identified by the query. Here, this information 249 is a table whose rows each correspond to a group of users satisfying the query at a different level of relevance. Each row is divided into the following columns: a rank column 211 indicating the group's relative relevance among all of the groups; an audience segment column 212 including an icon whose color reflects the level of relevance of the group, as well as a textual name for the group; a relevance events column 213 that contains an indication of the number of web pages matching the query that were viewed by each member of the group; a relevance score column 214 containing a numerical score indicating how relevant the members of the group are to the query; a reach size column 215 indicating the number of users in the group; a reach percentage column 216, indicating the percentage of total unique users that are in this group; a CPM column 217 indicating a cost-per-thousand impressions for advertising to members of this group; and an include in segment column 218, containing a checkbox that the user may check in order to include this group of users in the segment that is defined or exported based upon this query. For example, row 219 corresponds to Group 1, having rank 1, whose members each read 198 web pages at the subject web site that matched the query, having a relevant score of 79.1, containing a single user which comprises 0.0% of the total unique users, and having a CPM of zero. The user selects the checkbox in this row in order to include this group in the segment. The facility computes the score shown in column 214 using a variety of approaches, which may include such aspects as the number of pages read by the members of the group; the relevance of the particular documents read by the group—that is, the extent to which they satisfy the query; the extent to which the members of the group focus on reading matching documents, to the exclusion of documents that do not match; the past conversion performance of the members of the group; etc.

FIG. 2B is a second view of the first sample user interface presented by the facility. The second view 230 includes additional rows 231-238 of table 249. The second view further contains button 238, which the user may select in order to save a segment definition based upon a query specified by the user. In some embodiments, the saved segment definition reflects only the contents of fields 201-203, while in other embodiments, the saved segment definition also includes information describing the checkboxes checked by the user in column 218, such as the highest rank among the rows whose checkbox is checked. The second view further contains a button 240 that the user may select in order to export a list of the selected users. In some embodiments, this list includes all of the users of all of the groups listed in table 249, while in other embodiments, it contains only the users in groups whose checkbox is checked. The exported list typically includes user identifiers for each exported user, and in some cases includes additional information relating to each such user.

Where the user selects button 240 to export a list of selected users, this exported list can typically be used immediately to conduct an advertising campaign with respect to this group of users, or perform some other action with respect to this group of users. Where the user selects button 239 to save a segment definition based upon the query, this saved segment definition can typically be used at any time in the future to populate the defined segment with whichever users satisfy the segment definition at that point in time. Such populated segments may then be used to conduct an advertising campaign with respect to the users within the populated segment, or to perform any other action with respect to these users.

The second view further contains a search results section 241 which lists the web pages of the subject web site satisfying the query. For example, the first row shows web page 244 to have rank 1 242, with a query satisfaction score of "0.3934689" 243. In some embodiments, web page name 244 is a link that the user may select in order to view a copy of this web page.

FIG. 2C is a display diagram showing a second typical user interface presented by the facility. The second user interface 250 includes a query field 251 similar to query field 201. It also contains a search button 252 similar to search button 206, and a save search button 253 that the user may select in order to save a query entered in query field 251 for future retrieval. The user interface includes suggested keywords 254 similar to suggested keywords 207, and an indication 255 of the subject web site and the time period whose data is used by the search.

The user interface further includes a table 280, in which each row relates to a group of users that may be included in the segment. The first row, rows 263, corresponds to rows 219-238 of the first user interface, in that it relates to all of the users who viewed any web page matching the query. Subsequent rows of the table, i.e., rows 264-269, each relate to a section of the subject web site, called a "category" of the subject web site, that contains a relatively high number of web pages satisfying the query, and the users who have accessed at least one web page of that category. Each row is divided into the following columns: an include column 256 containing a checkbox that the user may select in order to include the group of users to which the row relates to the segment; a rank column 257 that, for category rows, indicates the relevance rank of the category among the other categories relative to the query; a category column 258 containing text identifying the category hierarchically within the subject web site; a relevance score column 259 containing a relevance score for the group of users similar to that in column 214; a reach column 260 indicating the number of users in the group of users; a total page views column 261 indicating, for category rows, the total number of times that pages within that category were requested during the period; and a frequency column 262 indicating, for category rows, the average number of web pages in this category requested during the period by users who requested at least one page within the category during the period. The table also includes an aggregate row 270, which contain values for columns 259-262 that are aggregated among the rows of table 280 whose checkbox in column 256 is checked. The second user interface further includes an export users button 272 similar to button 240, and a create segment button 271, similar to button 239.

In some embodiments, the facility uses additional user interfaces, such as user interfaces that characterize the users identified by the query in a variety of other ways. In some embodiments, the facility enables the user to "drill down" into groups of users identified using the query, to select and display attributes for individual such users. For example, in some embodiments, the facility displays such individual user attributes as sex, household income, frequency with which the user visits the subject web site or particular pages or sections thereof, recency with which the user has visited the subject web site or pages or sections thereof, etc. In other user interfaces, the facility automatically selects representative users among the identified users and displays their characteristics. The facility can perform this automatic selection by selecting users randomly from among the identified users, or by selecting users having different levels of relevance to the query selected from across the relevancy spectrum. In other user interfaces, the facility displays information characterizing identified users using a variety of other forms of statistical overview of these users, including statistical overviews of user properties such as those discussed above. Some user interfaces display a list of properties commonly possessed by identified users that distinguish the identified users from other users in the population; that is, that are not commonly possessed by other users of the population. In some embodiments, such attributes are discerned using the process described in U.S. patent application Ser. No. 09/751,366, filed on Dec. 29, 2000, which is hereby incorporated by reference in its entirety.

Figure 3:
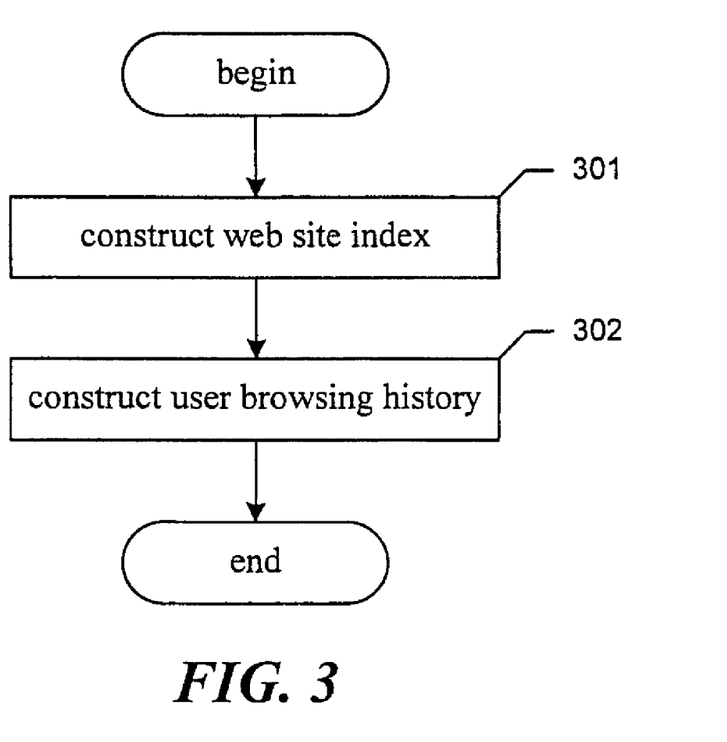
FIG. 3 is a flow diagram showing steps to be performed by the facility in order to generate the information used by the facility in creating new segment definitions.

FIG. 3 is a flow diagram showing steps to be performed by the facility in order to generate the information used by the facility in creating new segment definitions. The facility typically performs these steps periodically, such as each hour or each day. In step 301, the facility constructs a web site index. In some embodiments, the facility crawls the subject web site by sending a series of requests to the web server that serves the subject web site. These requests seek to identify some or all of the pages that presently comprise the subject web site, and retrieve the textual content of each. The facility then analyzes the textual content of these web pages to construct an index that, for each of a number of words appearing among the textual content of the pages, identifies the pages of the subject web site that contain this word. A sample index constructed by the facility is shown in FIG. 4A, and discussed below.

In step 302, the facility constructs a user browsing history for the subject web site. In some embodiments, the facility retrieves and analyzes the web log for the subject web site, generating a user browsing history that indicates, for each page of the subject web site, the users that requested that page during a recent period. In some embodiments, the facility performs this step in a manner described in U.S. patent application Ser. No. 09/613,403, filed on Jul. 11, 2000, which is hereby incorporated by reference in its entirety. In some embodiments, the facility generates the user browsing history in a variety of other ways, including constructing it based upon HTTP requests received at a web server each time the user retrieves a web page from the subject web site responsive to a special inclusion link contained in each web page of the subject web site, based upon information provided by client-side agents executing on the web client computer systems; based upon information collected by proxy servers through which users' page retrieval requests for the subject web site pass; etc. A sample user browsing history is shown in FIG. 4B and discussed below. After step 302, these steps conclude.

Figure 4A:
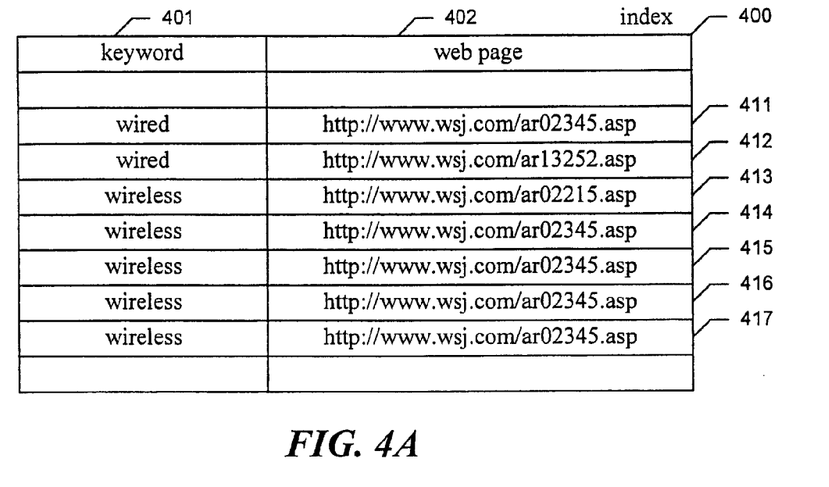
FIGS. 4A-4B are data structure diagrams showing typical data structures used by the facility to maintain information about the contents of documents used by the facility and their access by advertising prospects.
Figure 4B:
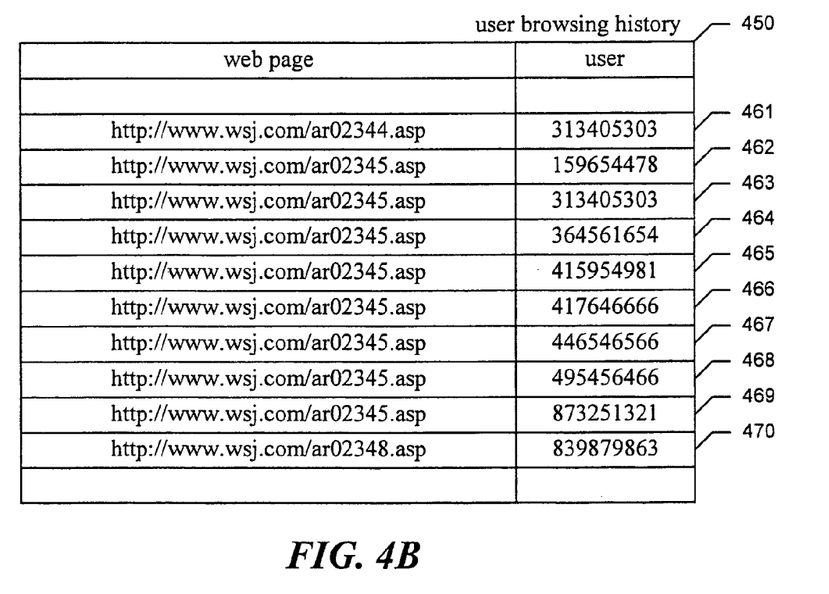

FIGS. 4A-4B are data structure diagrams showing typical data structures used by the facility to maintain information about the contents of documents used by the facility and their access by advertising prospects. While these data structures are shown in a form intended to be comprehensible to the reader, those skilled in the art will appreciate that these data structures may take a variety of other forms, include additional data, and take advantage of various kinds of optimizations that enable the facility to perform query processing in real-time.

FIG. 4A is a data structure diagram showing a sample index data structure used by the facility to identify web pages or other documents containing different keywords. The index 400 is comprised of a number of rows, including rows 411-417. The index also includes additional rows not shown. Each row is divided into a keyword column 401, and a web page column 402. In each row, the keyword column contains a keyword that occurs on a web page identified in the web page column. For example, row 414 indicates that the keyword "wireless" occurs on a web page having URL "http://www.wsj.com/ar02345.asp".

FIG. 4B is a data structure diagram showing a sample user browsing history used by the facility. The user browsing history 450 is comprised of rows including rows 461-470. Each of the rows is divided into a web page column 451 and a user column 452. In each row, the web page column contains a URL identifying a particular web page, while the user column contains a unique identifier identifying a user that visited the identified web page during a recent period of time. For example, row 462 indicates that a user having user identifier "159654478" visited a web page having URL "http://www.wsj.com/ar02345.asp"—that is, the web page identified by row 415 of index 400 as containing the keyword "wireless."

Figure 5:
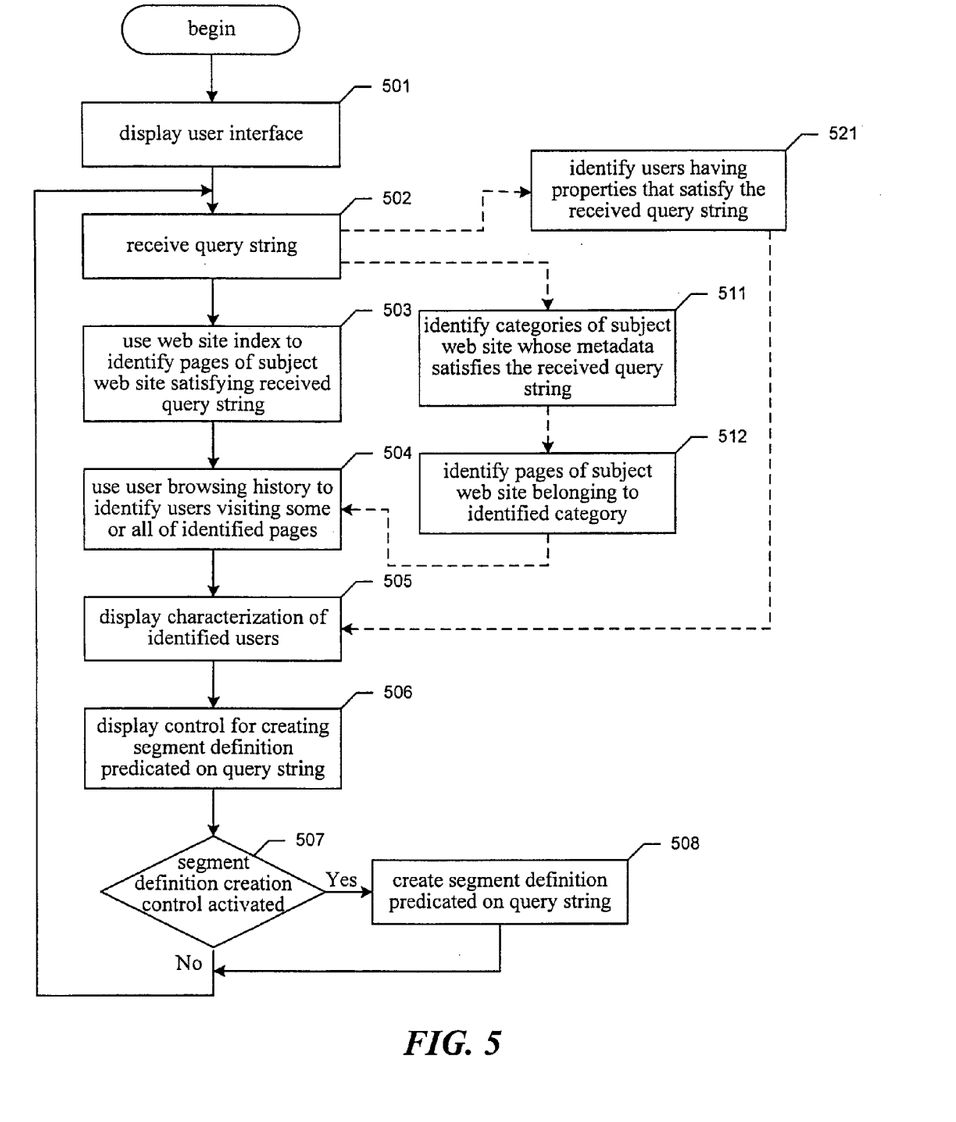
FIG. 5 is a flow diagram showing steps to be performed by the facility in order to create new segment definitions.

FIG. 5 is a flow diagram showing steps to be performed by the facility in order to create new segment definitions. In step 501, a facility displays a user interface into which the user can enter a query string, such as the user interfaces depicted in FIGS. 2A-2C. In step 502, the facility receives a query string entered by the user. In some embodiments, rather than receiving the query string directly via a user interface as shown in steps 501-502, the facility instead receives the query string via another mechanism. As one example, in some embodiments, the facility receives the query string at a TCP socket in the form of an XML request.

In step 503, the facility uses the web site index to identify pages of the subject web site satisfying the query string received in step 502. In some embodiments, the facility in step 503 assigns each page a query score quantifying the extent to which the page satisfies the query. In step 504, the facility uses a user browsing history to identify users visiting some or all of the pages identified in step 503. In step 505, the facility displays a characterization of the identified users, such as one or more of those depicted in FIGS. 2A-2C. In some embodiments, rather than displaying the characterization of the identified users as shown in step 505, the facility outputs this characterization in another manner, such as by storing, sending, or printing the characterization as a report, as a file, or in another format.

In step 506, the facility displays a control for creating a segment definition predicated on the query string received in step 502. In some embodiments, the facility displays additional controls for selecting different groups of identified people for inclusion in the segment to be defined. In step 507, if the segment definition creation control is activated, then the facility continues in step 508, or else the facility continues in step 502 to receive the next query string. In step 508, the facility creates a segment definition predicated on the query string received in step 502. Where the facility employs controls for selecting groups of users for the segment, the segment definition created in step 508 includes only the people in the groups selected. The segment definition created in step 508 may be used by the publisher of the subject web site to sell advertising for the defined segment. The segment may periodically be populated for use in such advertising by performing the processing of steps 503 and 504 with respect to the query string stored in the created segment definition. In some embodiments, the facility performs such population using techniques described in U.S. Patent Application Nos. 60/479,353 and 60/479,609, both filed on Jun. 17, 2003, each of which is hereby incorporated by reference in its entirety. In some embodiments, rather than creating a segment definition, the facility in step 508 exports information specifically identifying the people identified by the query, such as a sequence of unique identifiers identifying these people, and/or other information corresponding to these people. After step 508, the facility continues in step 502 to receive the next query string.

In some embodiments, instead of or in addition to identifying users that have visited pages that satisfy the query string as shown in steps 503-504, the facility employs additional approaches to identify users. In some embodiments, after step 502, in step 511, the facility identifies categories of the subject web site whose metadata satisfies the received query string. A variety of such metadata may be associated with categories of the subject web site, including such metadata as category name, category description, category keywords, etc. After step 511, in step 512, the facility identifies pages of the subject web site that belong to the identified category. After step 512, the facility continues in step 504 to identify users visiting the pages identified in step 512. In some embodiments, after step 502, in step 521, the facility identifies users whose properties satisfy the received query string. Such user properties may include virtually any textural information provided by or collected about a user. After step 521, the facility continues in step 505 to display a characterization of the users identified in step 521.

In a range of embodiments, the facility enables its user to select a segment or audience of people based upon a wide variety of kinds of interactions of those users with a wide variety of objects having text associated with them. As examples: the facility may identify people who bought or rated a product or other item that has product description text associated with it that matches a query; identify users who read documents that satisfy a query; identify users that send or receive email messages or messages of other types whose contents or metadata satisfy a query; identify people who retrieve or listen to music whose lyrics match a query; etc. In some embodiments, the facility identifies people who interacted with objects that, while their text does not satisfy a query, text associated with objects that are related to the interacted-with objects in a particular way—such as sharing a common metadata attribute (such as musical artist identity), or such as by links in one or both directions (such as a first page of the subject web site that is linked to a second page of the subject web site)—does satisfy the query.

It will be appreciated by those skilled in the art that the above-described facility may be straightforwardly adapted or extended in various ways. For example, the facility may be used to define segments in populations of people other than computer users visiting one or more particular web sites. Further, the facility may be used to create segments of people based upon their access to, retrieval of, reading of, or other interaction with documents other than web pages. The facility may display a wide variety of different types of information characterizing the membership of a segment defined by the facility. The facility may use a wide variety of visual user interfaces and other user interfaces to interact with its users. Segment definitions created by the facility may be stored in a wide variety of forms, and the segments defined thereby may be populated in a variety of different ways. While the foregoing description makes reference to certain preferred embodiments, the scope of the invention is defined solely by the claims that follow and the elements recited therein.

I claim:

1. A method in a computing system for defining a group of people, comprising:
    providing a visual user interface containing a control for receiving a query string;
    receiving a query string via the control;
    using an index on a body of documents to identify documents of the body that satisfy the received query string;
    accessing a record indicating which documents of the body were accessed by each of a population of people during a foregoing time period to identify people among the population that accessed at least a threshold number of the identified documents during the foregoing time period; and
    displaying within the visual user interface, in conjunction with the control, information characterizing the people identified.

2. The method of claim 1 wherein the displaying step is performed within 30 seconds of the receiving step.

3. The method of claim 1, further comprising:
    receiving a modified query string via the control; and
    repeating the two identifying acts and the displaying act with respect to the received modified query string.

4. The method of claim 1 wherein the body of documents is a set of web pages available at a subject web site.

5. The method of claim 4, further comprising building the index based on the textual content of the web pages of the set.

6. The method of claim 1 wherein the threshold number is a constant.

7. The method of claim 1 wherein the threshold number is a predetermined percentage of the number of identified documents.

8. A computer-readable medium whose contents cause a computing system to define a group of people by:
    providing a visual user interface containing a control for receiving a query string;
    receiving a query string via the control;
    using an index on a body of documents to identify documents of the body that satisfy the received query string;
    accessing a record indicating which documents of the body were accessed by each of a population of people during a foregoing time period to identify people among the population that accessed at least a threshold number of the identified documents during the foregoing time period; and
    displaying within the visual user interface, in conjunction with the control, information characterizing the people identified.

* * * * *